(12) United States Patent
Mori et al.

(10) Patent No.: US 10,838,381 B2
(45) Date of Patent: Nov. 17, 2020

(54) SETTING SYSTEM, SETTING DEVICE, SETTING METHOD, AND SETTING PROGRAM

(71) Applicant: YOKOGAWA ELECTRIC CORPORATION, Musashino-shi, Tokyo (JP)

(72) Inventors: Hiroshi Mori, Musashino (JP); Fuyuki Mizushima, Musashino (JP); Tomohiro Urata, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 90 days.

(21) Appl. No.: 16/156,201

(22) Filed: Oct. 10, 2018

(65) Prior Publication Data

US 2019/0113898 A1  Apr. 18, 2019

(30) Foreign Application Priority Data

Oct. 13, 2017 (JP) ................................ 2017-199782

(51) Int. Cl.
   *G05B 19/042* (2006.01)
(52) U.S. Cl.
   CPC .. *G05B 19/042* (2013.01); *G05B 2219/23405* (2013.01); *G05B 2219/25428* (2013.01)
(58) Field of Classification Search
   CPC ........ G05B 19/042; G05B 2219/25428; G05B 2219/23405; G05B 23/0221
   See application file for complete search history.

(56) References Cited

U.S. PATENT DOCUMENTS

| 2004/0259533 | A1* | 12/2004 | Nixon | H04W 76/14 455/414.1 |
| 2007/0250180 | A1* | 10/2007 | Bump | G05B 19/41845 700/1 |
| 2007/0280287 | A1* | 12/2007 | Samudrala | G05B 19/4185 370/466 |
| 2009/0228611 | A1* | 9/2009 | Ferguson | G06F 8/60 710/8 |

(Continued)

FOREIGN PATENT DOCUMENTS

DE  102008042919 A1 * 4/2010 .......... G05B 19/042
JP  2005044111 A    2/2005

*Primary Examiner* — Christopher E. Everett
(74) *Attorney, Agent, or Firm* — Kenja IP Law PC

(57) ABSTRACT

A setting system 1 includes a device configuration database DB1 that stores setting data in a first format in which a device parameter to be set to a field device 11 and identification information that logically identifies the device parameter are associated, and for which authority prescribed in advance is required in order to change the stored data, and in which, using device configuration information specifying the physical structure of the field device 11 and the setting data in the first format obtained by reference to the database DB1, setting data is generated in a second format in which physical information specifying the physical address at which the device parameter is to be set is associated with the device parameter, and is set to the field device. According to this setting system, it is possible to perform exchange of a field device without any requirement for engineering by a system engineer, thereby avoiding a device in production efficiency.

9 Claims, 10 Drawing Sheets

(56) References Cited

U.S. PATENT DOCUMENTS

| | | | |
|---|---|---|---|
| 2011/0191500 A1* | 8/2011 | Odayappan | G05B 19/0426 710/8 |
| 2012/0036568 A1* | 2/2012 | Kodama | H04L 63/101 726/7 |
| 2012/0235479 A1* | 9/2012 | Seiler | G05B 19/042 307/11 |
| 2012/0303144 A1* | 11/2012 | Grossmann | G05B 19/0426 700/90 |
| 2013/0211546 A1* | 8/2013 | Lawson | G05B 19/4185 700/9 |
| 2013/0211547 A1* | 8/2013 | Buchdunger | G05B 19/0426 700/11 |
| 2015/0058778 A1* | 2/2015 | Tokuoka | G05B 23/0224 715/771 |
| 2015/0066162 A1* | 3/2015 | Hokeness | G05B 19/0426 700/28 |
| 2015/0105871 A1* | 4/2015 | Ochsenreither | G05B 19/0426 700/29 |
| 2016/0139581 A1* | 5/2016 | Wagener | G05B 19/042 700/19 |
| 2016/0291563 A1* | 10/2016 | Kumar | H04L 41/0883 |

* cited by examiner

| Device parameter | | Identification information | |
|---|---|---|---|
| Device parameter name | Set value | Object name | Relative address |
| P101 | 15 | Obj001 | +10th address |
| P102 | 10 | Obj001 | +35th address |
| P103 | 25 | Obj002 | +15th address |
| ⋮ | ⋮ | ⋮ | ⋮ |

| Object name | Starting address |
|---|---|
| Obj001 | 1000 Address |
| Obj002 | 2000 Address |
| Obj003 | 3000 Address |
| ⋮ | ⋮ |

FIG. 6

| Device parameter | | Physical information |
|---|---|---|
| Device parameter name | Set value | Physical address |
| P101 | 15 | 1010 Address |
| P102 | 10 | 1035 Address |
| P103 | 25 | 2015 Address |
| ⋮ | ⋮ | ⋮ |

START

Acquire actual device configuration information and store in device configuration information database — S1

Acquire logical device setting data by referring to device configuration database — S2

Generate setting data for download by converting logical identification format to device dependent format — S3

Perform downloading — S4

END

| Device parameter | | Identification information (object name, relative address) or physical information (physical address) | |
|---|---|---|---|
| Device parameter name | Set value | | |
| P101 | 15 | Obj001 | +10 Address |
| P102 | 10 | Obj001 | +35 Address |
| P103 | 25 | 2015 Address | |
| ⋮ | ⋮ | ⋮ | |

SETTING SYSTEM, SETTING DEVICE, SETTING METHOD, AND SETTING PROGRAM

REFERENCE TO CORRESPONDING APPLICATION

The present application asserts the priority right of Japanese Patent Application 2017-199782 (filed on 13 Oct. 2017), and hereby incorporates the entire disclosure of that application by reference.

TECHNICAL FIELD

This disclosure relates to a setting system, to a setting device, to a setting method, and to a setting program.

BACKGROUND

A process control system that is set up in a plant or a workplace or the like (hereinafter, as a generic term, all these will be simply referred to as "a plant") generally is built by connecting so called field equipment (such as measurement devices or operating devices) and a controller that controls them via a communication means. In such a process control system, process values obtained by the field devices (for example measured values such as pressure, temperature, flow rate and so on) are collected by the controller, and the controller performs operation to operate (i.e. to control) the field devices according to these process values that have been collected. Automatic high-level automated operation of the plant or the like is realized by repeating operations of this type.

In most conventional process control systems, the field devices and the controller are connected together by transmission lines, and analog signals (for example 4-20 mA signals) are thereby transmitted and received between the field devices and the controller. On the other hand, there are many recent process control systems in which the field devices and the controller are connected together via, for example, a wired network or a wireless network, and thereby digital signals are interchanged between the field devices and the controller.

Unlike prior art field devices that transmit and receive analog signals, for field devices that are capable of digital communication, it is necessary to establish in advance settings that are required for them to perform predetermined operation (this is termed "engineering"). Communication settings for enabling communication via the network and function block settings for enabling function blocks to operate may be cited as examples. It should be understood that function blocks are conceptual objects formed by expressing basic units of control functionality as blocks: examples are an input block, an output block, a PID (proportional-integral-derivative) block and so on. Such function blocks are realized by installing software on the field devices.

This type of engineering is generally performed by using engineering equipment. Concrete examples of engineering procedures are as follows. First, information describing configuration internal to the field device is acquired from a CF file (Capability File) in which performance information and resource information for the field device and so on are described, and from a DD (Device Description) file in which attribute information such as device parameters and so on are described. Next, setting data to be set to the field device is generated on the basis of the configuration information that has thus been acquired and communication definition data and application definition data that are defined by the user. Then, the setting data that has thus been generated is downloaded (i.e. is read into) the field device at the site of the plant where the field device is installed.

The engineering described above (the engineering up to the generation of the setting data) is termed "off-line engineering". With this off-line engineering, it is possible to prepare setting data for download to the field device in advance, even in an environment in which the field device is not present. Thus, off-line engineering provides the advantage that, for example, it is possible to shorten the working time at the site of the plant, since it is possible to generate a plurality of sets of setting data in advance, and to download these sets in order to a plurality of field devices that are installed at the plant site. The following document PTL1 discloses an example of such a field bus system with which off-line engineering can be performed.

CITATION LIST

Patent Literature

PTL1: JP200544111A

SUMMARY

Now, when performing exchange of a field device due to a failure or the like, it is necessary to perform the engineering described above for the new field device. If the type of the field device or the device revision before and after exchange are different, then, since the configuration information internal to the field device is different before and after exchange, accordingly it is necessary to generate new setting data to be set to the field device by employing a new CF file and a new DD file supplied from the vendor for the new field device. Moreover, it is necessary to change the contents of a device configuration database provided to the engineering equipment (i.e. a database in which the setting data for the various field devices are stored).

However, a predefined authority granted in advance is required in order to change the device configuration database described above, and a person who does not possess that authority is not able to change the device configuration database. For example, in a typical plant, the allocation of responsibility is clear, and system engineers are authorized to make changes in the device configuration database, but authority to make changes in the device configuration database is not granted to operating staff who are permanently stationed at the plant or to maintenance staff.

Unlike operating staff and maintenance staff, system engineers are not permanently stationed at the plant, and accordingly there is the problem that, in the event of a failure occurring in a field device, it is not possible for the job of exchanging the field device to be performed until a system engineer is dispatched. Furthermore there is the problem that, in the event of failure of a field device, it is inevitable that, over a long period of time until the system engineer arrives at the plant, it will be necessary for the plant to operate in a condition of reduced production efficiency, or for production to be halted, so that a large influence will be exerted upon production activity (i.e., serious damage will be caused).

It may also be considered that the problem described above may be solved by a system engineer operating the engineering device by remote access from outside the plant. However, from the viewpoint of ensuring security, the network within the plant is often isolated from external networks, and also it is often difficult to perform such engineering by remote access because close cooperation with on-site workers is required for engineering of the field devices.

This disclosure has been conceived in the light of the considerations described above, and its object is to provide a setting system, a setting device, a setting method, and a setting program with which it is possible to perform exchange of a field device without any requirement for engineering by a system engineer, so that it is possible to avoid a reduction in production efficiency.

A setting system according to some embodiments is a setting system (1 through 4) that sets settings to a field device (11) required for predetermined operation to be performed by the field device. The setting system comprises and engineering terminal (15) and a setting device (12, 12a, 12b, 14, 16). The engineering terminal (15) comprises a database (DB1) that stores setting data (D11) in a first format in which a device parameter to be set to the field device and identification information that logically identifies the device parameter are associated, and for which authority prescribed in advance is required in order to change the stored data. The setting device (12, 12a, 12b, 14, 16), using device configuration information (D2) specifying the physical structure of the field device and the setting data in the first format obtained by reference to the database of the engineering terminal, generates setting data (D13) in a second format in which physical information specifying the physical address at which the device parameter is to be set is associated with the device parameter, and sets the setting data to the field device. According to this setting system, the setting data in the second format may be downloaded to a new field device. For this reason, it is possible for exchange of the field device to be performed without any requirement for engineering by a system engineer. As a result, it is possible to prevent deterioration of the production efficiency of the plant.

In an embodiment, the identification information includes object identification information in which information that identifies an object to which the device parameter belongs and relative address information that specifies the relative address at which the device parameter is to be set are associated; the device configuration information includes information in which the object identification information that identifies the object and starting address information that specifies the starting address of the object are associated; and the setting device generates the setting data in the second format by using the relative address information and the starting address information with which the same object identification information is associated. Since the setting system employs the setting data in the second format generated in this manner, accordingly it is possible to exchange the field device without any requirement for engineering by a system engineer. As a result, it is possible to prevent deterioration of the production efficiency of the plant.

In an embodiment, in addition to the setting data in the first format, the database stores setting data in the second format; and the setting device sets to the field device the setting data in the second format generated by using the device configuration information and the setting data in the first format obtained by reference to the database, or the setting data in the second format obtained by reference to the database. Since the setting data in the second format is set to the field device in this manner, accordingly it is possible to exchange the field device without any requirement for engineering by a system engineer. As a result, it is possible to prevent deterioration of the production efficiency of the plant.

In an embodiment the database stores, in association, setting data in the first format for a target field device that is one among several field devices, and setting data in the first format for another field device that performs communication with the target field device; and the setting device sets the setting data in the first format to the target field device, and sets the setting data in the first format to the another field device. By the setting device setting, for these field devices, the setting data in the first format to the field device and to the other field device in this manner, accordingly, with this setting system, it is possible to exchange the field device without any requirement for engineering by a system engineer. As a result, it is possible to prevent deterioration of the production efficiency of the plant.

In an embodiment, in addition to the setting data in the first format, the database stores common data (D12) employed by a control application of the process control system that does not depend upon the field device, and the setting device sets the common data to the field device, along with the setting data in the first format. By doing this, and by the setting device setting the common data to the field device, with this setting system, it is possible to exchange the field device without any requirement for engineering by a system engineer. As a result, it is possible to prevent deterioration of the production efficiency of the plant.

In an embodiment, the setting device comprises a storage unit (33) that stores the setting data in the second format that has been generated. In this case, it is possible to generate the setting data in the second format even in an environment in which the field device is not present. For this reason, this setting system is capable of shortening the working time in the field yet further.

In an embodiment, the setting device comprises a device configuration information uploading unit (31) that acquires the device configuration information from the field device, and a device configuration information database (DB2) that stores the device configuration information acquired by the device configuration information acquisition unit. For this reason, this setting system is able to generate the setting data in the second format by further employing the information stored in the device configuration information database (DB2), and is able to set the setting data having the second format to the field device. For this reason, with this setting system, it is possible to exchange the field device without any requirement for engineering by a system engineer. As a result, it is possible to prevent deterioration of the production efficiency of the plant.

A setting device according to some embodiments is a setting device (12, 12a, 12b, 15a, 16) that sets settings to a field device (11) required for predetermined operation to be performed by the field device, comprising: a database (DB1, DB10), a generation unit (32) and a downloading unit (33). The database (DB1, DB10) stores setting data (D11) in a first format in which a device parameter to be set to the field device and identification information that logically identifies the device parameter are associated, and for which authority prescribed in advance is required in order to change the stored data. The generation unit (32), using device configuration information (D2) specifying the physical structure of the field device and the setting data in the first format obtained by reference to the database, generates setting data (D13) in a second format in which physical information specifying the physical address at which the device parameter is to be set is associated with the device parameter. The downloading unit (33) sets to the field device the setting data in the second format. According to this setting device, the setting data in the second format may be downloaded to a new field device. For this reason, it is possible for exchange of the field device to be performed without any requirement for engineering by a system engineer. As a result, it is possible to prevent deterioration of the production efficiency of the plant.

A setting method according to some embodiments is a setting method that sets settings upon a field device (11) required for predetermined operation to be performed by the field device, comprising: a first step (S2), a second step (S3) and a third step (S4). The first step (S2) is a step of obtaining setting data in a first format by referring to a database (DB1, DB10) that stores setting data (D11) in the first format in which a device parameter to be set to the field device and identification information that logically identifies the device parameter are associated, and for which authority prescribed in advance is required in order to change the stored data. The second step (S3) is a step of, using device configuration information specifying the physical structure of the field device and the setting data in the first format obtained in the first step, generating setting data (D13) in a second format in which physical information specifying the physical address at which the device parameter is to be set is associated with the device parameter. The third step (S4) is a step of setting to the field device the setting data in the second format that was generated in the second step. According to this setting method, the setting data in the second format may be downloaded to a new field device. For this reason, it is possible for exchange of the field device to be performed without any requirement for engineering by a system engineer. As a result, it is possible to prevent deterioration of the production efficiency of the plant.

A setting program according to some embodiments is a setting program that causes a computer that sets settings to a field device (11) required for predetermined operation to be performed by the field device to function as a database (DB1, DB10), a generation unit (32) and a downloading unit (33). The database (DB1, DB10) stores setting data (D11) in a first format in which a device parameter to be set to the field device and identification information that logically identifies the device parameter are associated, and for which authority prescribed in advance is required in order to change the stored data. The generation unit (32), using device configuration information specifying the physical structure of the field device and the setting data obtained by reference to the database, generates setting data (D13) in a second format in which physical information specifying the physical address at which the device parameter is to be set is associated with the device parameter. The downloading unit (33) sets to the field device the setting data in the second format. According to this setting program, the setting data in the second format may be downloaded to a new field device. For this reason, it is possible for exchange of the field device to be performed without any requirement for engineering by a system engineer. As a result, it is possible to prevent deterioration of the production efficiency of the plant. The setting program may be stored in a non-transitory computer readable storage medium.

According to the present disclosure, exchange of a field device can be performed without any requirement for engineering by a system engineer, and, for this reason, an advantageous effect is obtained in that it is possible to avoid a decrease in production efficiency.

BRIEF DESCRIPTION OF THE DRAWINGS

In the accompanying drawings:

FIG. 4 is a diagram illustrating an example, in the first embodiment, of a device specific setting data portion included in logical device setting data;

FIG. 5 is a diagram illustrating an example, in the first embodiment, of device configuration information for an actual device;

FIG. 6 is a diagram illustrating an example, in the first embodiment, of a device specific setting data portion included in setting data for download;

FIG. 7 is a flow chart illustrating a setting method performed by a setting system according to the first embodiment;

DETAILED DESCRIPTION

Setting systems, setting devices, setting methods, and setting programs according to embodiments of the present disclosure will now be explained in detail in the following with reference to the appended drawings.

Embodiment 1

Process Control System

Figure 1:
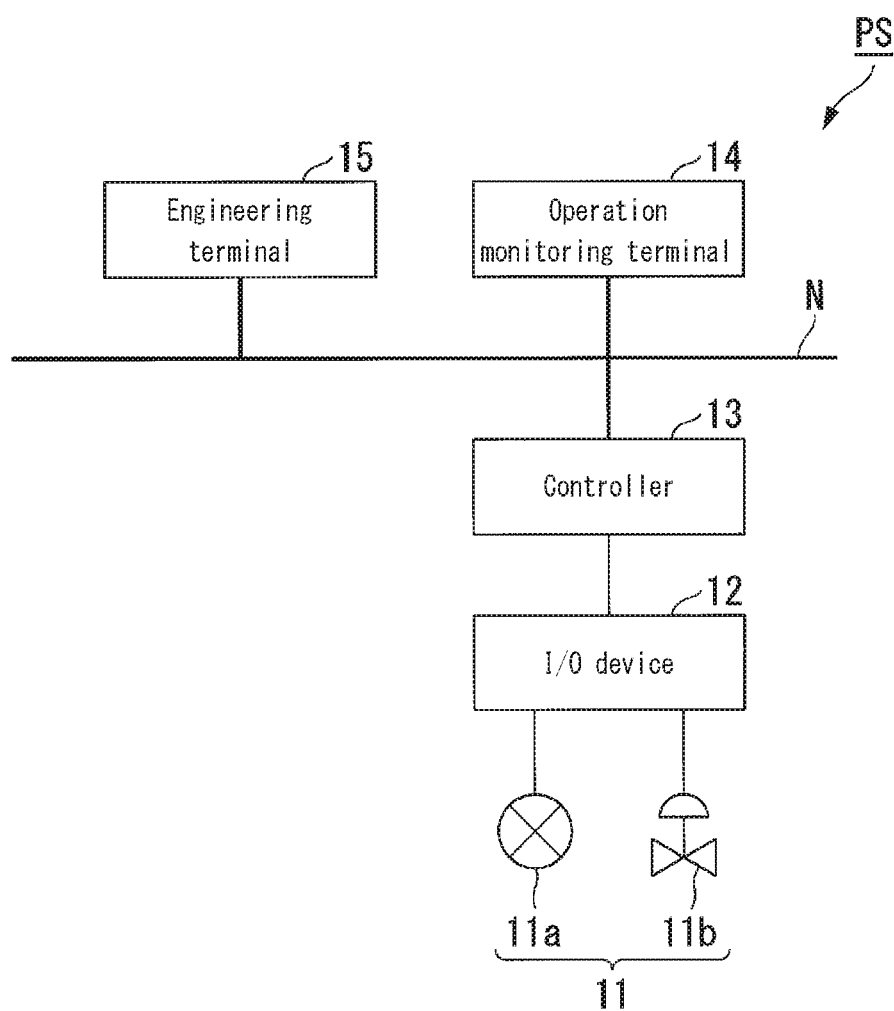
FIG. 1 is a block diagram illustrating the structure of principal portions of a process control system.

FIG. 1 is a block diagram illustrating the structure of principal portions of a process control system. As illustrated in FIG. 1, this process control system PS comprises field devices 11, an I/O device 12, a controller 13, an operation monitoring terminal 14 (i.e. a setting device), and an engineering terminal 15 (i.e. an engineering device); and, according to commands from the operation monitoring terminal 14, the controller 13 performs control of industrial processes that are implemented in a plant (not illustrated in the drawing) by controlling the field devices 11. It should be understood that, in this process control system PS, a setting system 1 that will be described hereinafter is employed when exchange of one of the field devices 11 is performed.

The field devices 11 are connected to the controller 13 via the I/O device 12. Moreover, the controller 13, the operation monitoring terminal 14, and the engineering terminal 15 are connected to a control network N. This control network N may, for example, be a network that is connected between the plant site and a monitoring room.

The field devices 11 may, for example, include sensor devices such as flow rate meters or temperature sensors or the like, or valve devices such as flow rate control valves or opening/closing valves or the like, or operating devices for fans or motors or the like, or other devices that are installed at the plant site. In FIG. 1, for ease of understanding, among a plurality of field devices 11 that are installed in the plant, a single sensor device 11a that measures the flow rate of a fluid and a single valve device 11b that controls (i.e. is operated to control) the flow rate of a fluid are illustrated. The field devices 11 may, for example, be capable of communications compliant with FF (Foundation Fieldbus (registered trademark)), which is a type of international standard field bus standardized according to IEC61158 by the IEC (International Electrotechnical Commission).

The I/O device 12 is provided between the field devices 11 and the controller 13, and connects the plurality of field devices 11 to the controller 13. The controller 13 performs control of the field devices 11 by communicating with the field devices 11 according to commands and so on from the operation monitoring terminal 14. In concrete terms, the controller 13 acquires process values that are measured by some of the field devices 11 (for example, by the sensor device 11a), calculates actuation amounts for others of the field devices 11 (for example, for the valve device 11b), and controls those other field devices 11 (for example, the valve device 11b) by transmitting those actuation amounts.

The operation monitoring terminal 14 may, for example, be an HMI (Human Machine Interface) terminal that is operated by operating staff of the plant and that is employed for process monitoring. In concrete terms, the operation monitoring terminal 14 acquires the input and output data for the field devices 11 from the controller 13, and, along with notifying the operating staff of the behavior of the field devices 11 and the controller 13 included in the process control system PS, also performs control of the controller 13 on the basis of commands issued by the operating staff. This operation monitoring terminal 14 may, for example, be realized by a computer such as a personal computer or a workstation or the like.

The engineering terminal 15 performs engineering of various kinds by employing design information (i.e. design information for the plant, including design information for the process control system PS) that is stored in an instrumentation database (omitted from the figure). For example, the engineering terminal 15 may perform engineering such as application building for the controller 13, defining I/O including the field devices 11, display screen building for the operation monitoring terminal 14, and so on. Like the operation monitoring terminal 14, the engineering terminal 15 may, for example, be realized by a computer such as a personal computer or a workstation or the like.

Setting System

Figure 2:
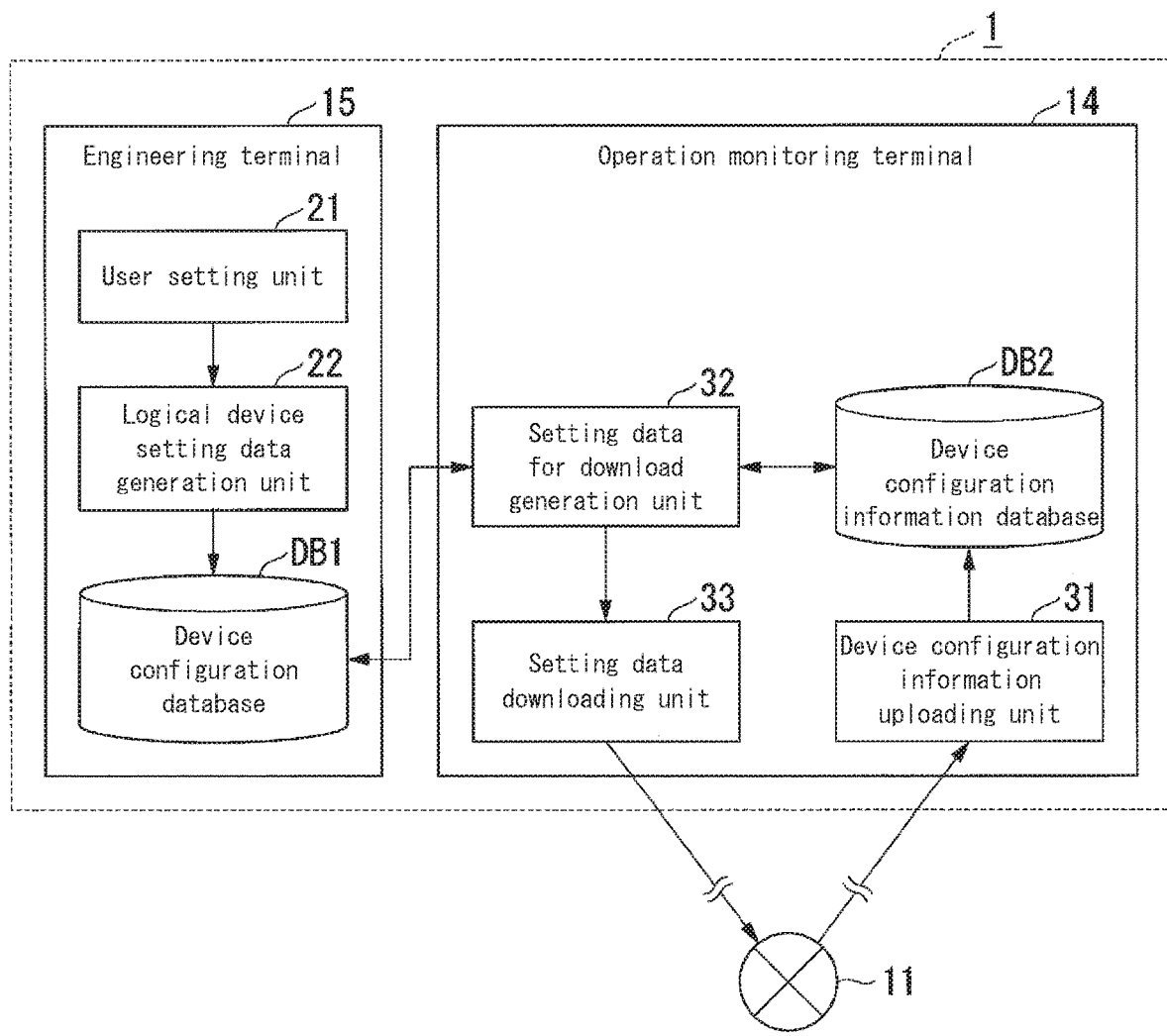
FIG. 2 is a block diagram illustrating the structure of principal portions of a setting system according to a first embodiment.
Figure 3:
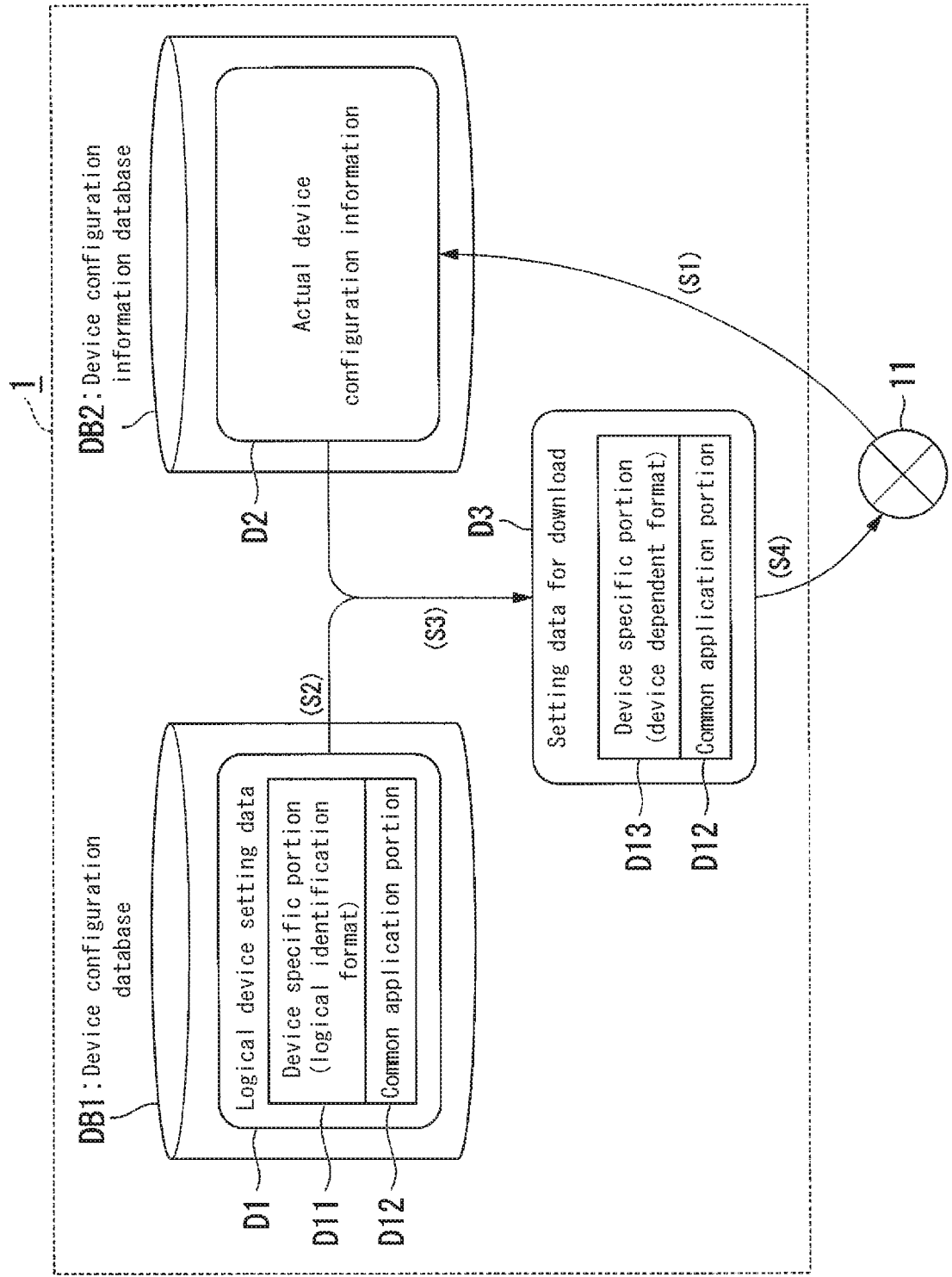
FIG. 3 is a figure block diagram illustrating an overview of a method for generating setting data in the first embodiment.

FIG. 2 is a block diagram illustrating the structure of principal portions of the setting system according to the first embodiment. FIG. 3 is a diagram illustrating an overview of a method for generating setting data in this first embodiment. As illustrated in FIG. 2, the setting system 1 of this embodiment is realized by the engineering terminal 15 and the operation monitoring terminal 14, and is a system that, for example, when one of the field devices 11 is to be exchanged, establishes upon the new field device 11 the required settings for causing that new field device 11 to perform its predetermined operation. As settings that the setting system may establish upon the new field device 11, for example, communication settings for setting up digital communication, function block settings for operation of function blocks, and so on may be cited.

The engineering terminal 15 comprises a user setting unit 21, a logical device setting data generation unit 22, and a device configuration database DB1. The engineering terminal 15 is, for example, operated by a system engineer, and generates setting data (hereinafter termed "logical device setting data") to be set for a logical field device (hereinafter referred to as a "logical device") that does not depend upon the device type or the device revision, and provides the logical device setting data D1 that it has generated (refer to FIG. 3) to the operation monitoring terminal 14.

The user setting unit 21 displays an input screen for data that is required for generation of the logical device setting data D1, and acquires data inputted by the user via this input screen. As examples of data thus acquired by the user setting unit 21, communication definition data defined by the user and application definition data may be cited. The logical device setting data generation unit 22 generates the logical device setting data D1 on the basis of this data acquired by the user setting unit 21, and stores it in the device configuration database DB1. It should be understood that the logical device setting data generation unit 22 may generate the setting data D1 by using a CF file and/or a DD file that have been read-in in advance, or may generate the setting data D1 by reading a CF file and/or a DD file from outside.

The device configuration database DB1 is a database that stores the logical device setting data D1 created by the logical device setting data generation unit 22, and is a database for the use of which a prescribed authority is required. For example, system engineer authority is required for changing the data stored in the device configuration database DB1, and the operating staff authority or maintenance staff authority permanently stationed at the plant is required for referring to the data stored in the device configuration database DB1. Accordingly, for example, a member of operating staff or maintenance staff permanently stationed in the plant is not able to change the data stored in the device configuration database DB1, but is able to refer to the data stored in the device configuration database DB1.

For each of the communications settings and the function block settings described above, the logical device setting data stored in the device configuration database DB1 is classified into device specific setting data portions D11 and common application portion setting data D12 (refer to FIG. 3). A device specific setting data portion D11 is a portion of the data that is set specifically for a field device 11 (a portion that depends upon the device type and the device revision of the field device 11), but is not data that is specific to the device 11 itself (for example, its physical address and so on), and is data that is described in a logical format which specifies that it is device specific data (hereinafter this will be termed the "logical identification format"). In other words, the device specific setting data portion D11 is data having a first format according to which identification information that logically identifies a parameter of the field device 11 is associated with a device parameter set for a portion specific to this device.

On the other hand, the common application portion setting data D12 is data that is used in common by the control applications of the process control system PS (in other words, this is data that does not depend upon the field devices). For example, the scale and the units of measurement of the function blocks and so on are included in this common application portion setting data D12. Accordingly, the setting data D1 in which the device specific setting data portion D11 and the common application portion setting data D12 are included consists of data that does not depend upon the field devices 11.

FIG. 4 is a diagram illustrating an example, in this first embodiment, of a device specific setting data portion included in the logical device setting data. As illustrated in FIG. 4, this device specific setting data portion D11 is data in which "identification information" is associated with "device parameter". Here, "device parameter" consists of "device parameter name" and "set value", while "identification information" consists of "object name" (i.e. object identification information) and "relative address" (i.e. relative address information).

For example, in the example illustrated in FIG. 4, in the first line of the setting data D11, the "device parameter name", the "set value", the "object name", and the "relative address" are respectively "P101", "15", "Obj001", and "address+10". This means that the set value for the device parameter whose device parameter name is "P101" is "15", the object name of the object to which this device parameter belongs is "Obj001", and the physical address of this device parameter (i.e. its address in the memory of the field device 11) is the address at the "address+10" from the starting address of that object.

Referring to FIG. 2 again, the operation monitoring terminal 14 comprises a device configuration information uploading unit 31 (i.e. a device configuration information acquisition unit), a setting data for download generation unit 32 (i.e. a generation unit or generation means), a setting data downloading unit 33 (i.e. a storage unit, setting unit, or setting means), and a device configuration information database DB2. This operation monitoring terminal 14 is, for example, operated by the operating staff of the plant, and generates setting data to be downloaded to the field device 11 (hereinafter termed "setting data for download") and downloads this setting data for download D3 that has thus been generated to the field device 11 (refer to FIG. 3).

When for example a field device 11 is to be exchanged, the device configuration uploading unit 31 acquires the device configuration information for the new field device 11 that has been newly connected (subsequently this will be termed "configuration information for the actual device) to the process control system PS from that field device 11, via the I/O device 12, the controller 13, and the control network N illustrated in FIG. 1. The device configuration information uploading unit 31 stores this actual device configuration information D2 that it has acquired (refer to FIG. 3) in the device configuration information database DB2.

The device configuration information database DB2 is a database in which actual device configuration information D2 that has been acquired by the device configuration information uploading unit 31 is stored. FIG. 5 is a figure illustrating an example of actual device configuration information in this first embodiment. As illustrated in FIG. 5, the actual device configuration information D2 is data in which "object names" (i.e., object identification information) and "starting addresses" (i.e. starting address information) are associated together. For example, in the example illustrated in FIG. 5, in the first line of the actual device configuration information, the "object name" and the "starting address" are respectively "Obj001" and "address 1000". This means that the name of the object is "Obj001" and that starting address of the object (in the memory of the field device) is "address 1000".

The setting data for download generation unit 32 generates the setting data for download D3 by employing the logical device setting data D1 that is stored in the device configuration database DB1 of the engineering terminal 15 and the actual device configuration information D2 that is stored in the device configuration information database DB2. In concrete terms, as illustrated in FIG. 3, the setting data for download generation unit 32 generates the setting data for download D3 by converting the device specific setting data portion D11 included in the logical device setting data D1 and described in the logical identification format into data D13 (in other words data that is specific to the device itself) in a format that depends upon the field device 11 (subsequently this will be termed a "device dependent format"). In other words, the setting data for download generation unit 32 generates setting data having a second format in which physical information indicating the physical address at which this device parameter is to be set is associated with the device parameter.

FIG. 6 is a figure illustrating an example, in the first embodiment, of a device specific setting data portion that is included in the setting data for download. As illustrated in FIG. 6, this device specific setting data portion D13 is data in which "physical information" is associated with "device parameter". Device parameter" consists of "device parameter name" and "set value", while "physical information" consists of "physical address".

For example, in the example illustrated in FIG. 6, in the first line of the setting data D13, the "device parameter name", the "setting value", and the "physical address" are respectively "P101", "15", and "address 1010". This specifies that the set value of the device parameter whose device parameter name is "P101" is "15", and that the physical address of this device parameter (in the memory of the field device 11) is "address 1010". It should be understood that the value of "address 1010" is a value generated by adding together "address 1000" which is the value included in the actual device configuration information illustrated in FIG. 5 and specifying the starting address, and "address+10" which is the value giving the relative address of the device specific setting data portion D11 illustrated in FIG. 4.

The setting data downloading unit 33 stores the setting data for download D3 that has been generated by the setting data for download generation unit 32. And the setting data downloading unit 33 transmits (i.e. downloads) the setting data for download D3 that has thus been stored to the field device 11 via the control network N, the controller 13, and the I/O device 12 illustrated in FIG. 1. This downloading of the setting data for download D3 may be performed directly after the setting data for download D3 has been generated by the setting data for download generation unit 32; or it may be performed upon a command which is issued from an operator of the operation monitoring terminal 14 (who may be, for example, a member of the operating staff of the plant).

Setting Method

FIG. 7 is a flow chart illustrating a setting method performed by the setting system according to the first embodiment. It should be understood that the reference symbols S1 through S4 to which arrows are affixed in the processing flow illustrated in FIG. 3 correspond to the processes S1 through S4 illustrated in FIG. 7. Here, for ease of understanding, an example will be explained of a case in which a member of the operating staff of the plant (i.e. a person who is authorized to refer to the device configuration database DB1 provided to the engineering terminal 15) is logged in to the operation monitoring terminal 14, and when settings for a field device 11 are being performed under the direction of the operating staff of the plant.

First, when the new field device 11 is newly connected to the plant control system P1, a process of acquiring the actual device configuration information D2 from this field device 11 and storing it in the device configuration information database DB2 is performed by the device configuration information uploading unit 31 of the operation monitoring terminal 14 (step S1). The actual device configuration information D2 is acquired from the field device 11 by the device configuration information uploading unit 31 via the I/O device 12, the controller 13, and the control network N illustrated in FIG. 1.

Next, the device configuration database DB1 provided to the engineering terminal 15 is referred to by the setting data for download generation unit 32 of the operation monitoring terminal 14. The process of acquiring the logical device setting data D1 from the device configuration database DB1 is performed by the setting data for download generation unit 32 of the operation monitoring terminal 14 (step S2: a first step).

Next, using the logical device setting data D1 that has thus been acquired and the actual device configuration information D2 stored in the device configuration information database DB2, the process of generating the setting data for download D3 is performed by the setting data for download generation unit 32 of the operation monitoring terminal 14 (step S3: a second step). In concrete terms, as illustrated in FIG. 3, processing is performed to generate the setting data for download D3 by converting the device specific setting data portion D11 that is described in the logical identification format included in the logical device setting data D1 to data D13 in the device dependent format (in other words, to data that is specific to the device itself) (step S3: the second step).

Processing is performed by the setting data downloading unit 33 of the operation monitoring terminal 14 to perform downloading of the setting data for download that has thus been created by the setting data for download generation unit 32 of the operation monitoring terminal 14 (step S4: a third step). By the processing described above being performed, the device parameter settings for the field device 11 that has been newly connected to the process control system PS are established, so that the field device 11 that has been newly connected is put into an operable state.

As described above, with the present embodiment, the setting data for download generation unit 32 of the operation monitoring terminal 14 refers to the device configuration database DB1 that is provided to the engineering terminal 15 in order to acquire the logical device setting data D1, and generates the setting data for download D3 by employing the logical device setting data D1 that has thus been acquired and the actual device configuration information D2 that is stored in the device configuration information database DB2. Following this, it is arranged for the setting data downloading unit 33 of the operation monitoring terminal 14 to download the setting data for download D3 that has thus been generated to the new field device 11 that has been newly connected to the plant control system P1. According to this, it is possible to perform exchange of the field device 11 without any requirement for engineering by a system engineer. As a result, it is possible to avoid a reduction in the production efficiency of the plant.

Moreover, with the present embodiment, the new off-line engineering is completed at the time point of creation of the device configuration database DB1, so that it is possible to shorten the working time in the field; and furthermore, if the actual device configuration information D2 is stored in the device configuration information database DB2, then it is possible to generate the setting data for download D3 even in an environment in which the field device is not present. In other words, with the setting system 1 of this embodiment, there is the further advantageous aspect in that it is possible to shorten the working time even further, in a similar manner to the case of prior art off-line engineering.

Embodiment 2

Figure 8:
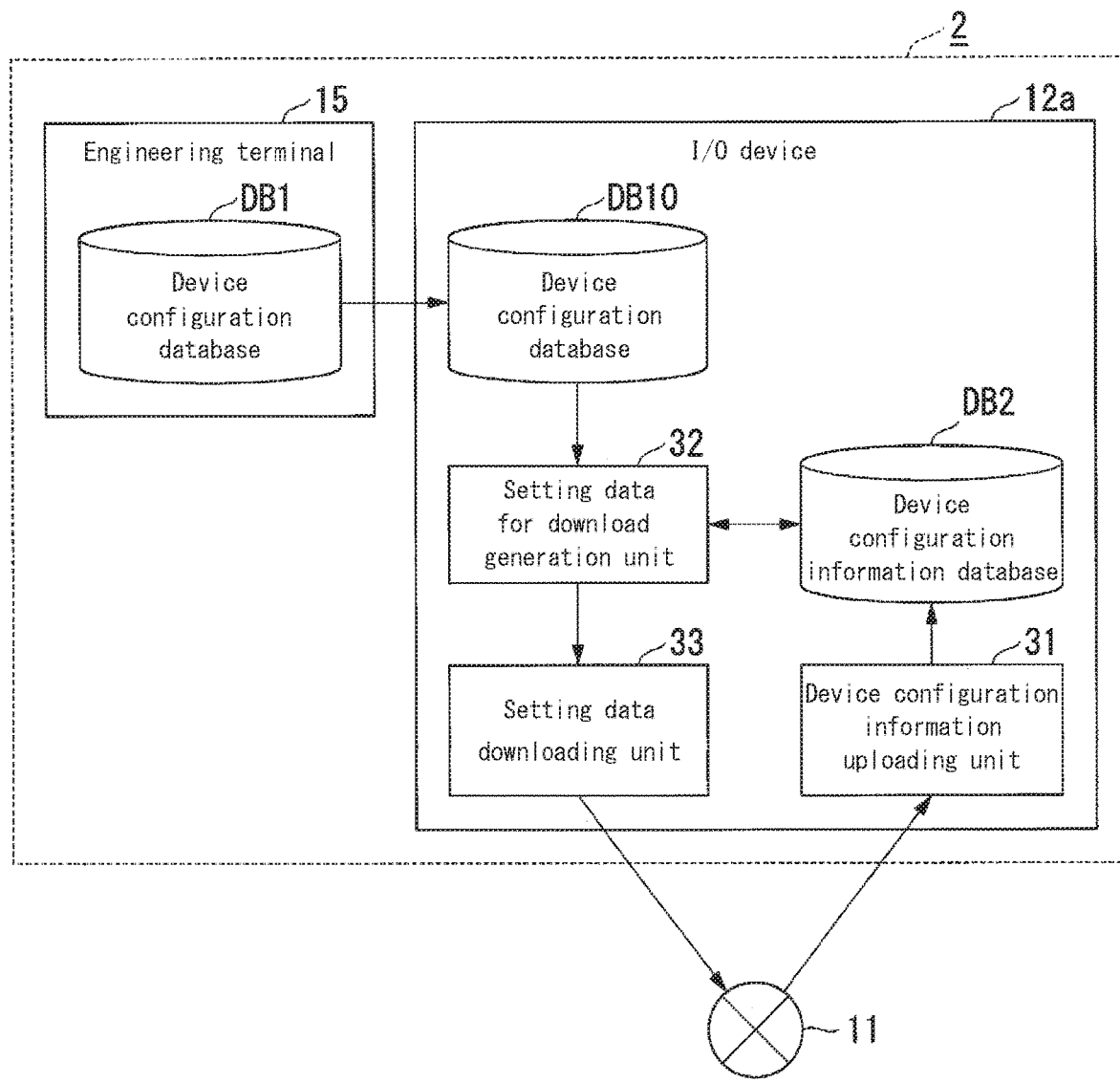
FIG. 8 is a block diagram illustrating the structure of principal portions of a setting system according to a second embodiment.

FIG. 8 is a block diagram illustrating the structure of principal portions of a setting system according to a second embodiment. As illustrated in FIG. 8, the setting system 2 of this embodiment is implemented by an engineering terminal 15 (i.e. an engineering device) and an I/O device 12*a* (i.e. a setting device), and is a system with which, when, for example, exchange of a field device 11 is to be performed, settings are established for the new field device 11 that are necessary in order to cause the new field device 11 to perform predetermined operations.

The engineering terminal 15 has a structure similar to that of the engineering terminal 15 of the first embodiment. It should be understood that illustration of the user setting unit 21 and the logical device setting data generation unit 22 is omitted from FIG. 8, and only the device configuration database DB1 is illustrated. In addition, the device configuration database DB1 is similar to that in the first embodiment, and, in order to use it, a prescribed authority is required in advance. For example, the authority of a system engineer is required in order to change data stored in the device configuration database DB1, and the authority of operating staff or maintenance staff permanently stationed in the plant is required in order to refer to data stored in the device configuration database DB1.

In addition to the device configuration information uploading unit 31, the setting data for download generation unit 32, the setting data downloading unit 33, and the device configuration information database DB2 that were provided to the operation monitoring terminal 14 of the first embodiment, the I/O device 12*a* is provided with a device configuration database DB10. This device configuration database DB10 is a similar database to the device configuration database DB1 that is provided to the engineering terminal 15.

In other words, a copy of part or all of the logical device setting data D1 (refer to FIG. 3) stored in the device configuration database DB1 that is provided to the engineering terminal 15 is also stored in the device configuration database DB10 of the I/O device 12*a*. A prescribed authority is required in advance in order to use this device configuration database DB10, just as in the case of the device configuration database DB1 that is provided to the engineering terminal 15. For example, the authority of a system engineer is required in order to change the data stored in the device configuration database DB1. It should be understood that the device configuration database DB10 that is provided in the I/O device 12*a* is set so that it can be referred to from the setting data for download generation unit 32 that is provided within the I/O device 12*a*.

With the setting system 2 of this embodiment, all of the components required for performing setting processing for the field device 11 (i.e. the device configuration information uploading unit 31, the setting data for download generation unit 32, the setting data downloading unit 33, the device configuration information database DB2, and the device configuration database DB10) are provided in the I/O device 12a. Due to this, with the setting system 2 of this embodiment, at the timing when the new field device 101 is connected to the process control system PS, it is possible for the I/O device 12a to which the field device 11 is connected automatically to execute a series of operations to acquire the actual device configuration information D2 from the field device 11, and to download the setting data for download D3 to the field device 11. It should be understood that, since the method for creating the setting data in this embodiment is the same as in the first embodiment, accordingly explanation thereof will here be omitted.

As described above, in the present embodiment, it is arranged for the setting data for download generation unit 32 of the I/O device 12a to refer to the device configuration database DB10 provided in itself to acquire the logical device setting data D1, and then to generate the setting data for download D3 by using this logical device setting data D1 that has thus been acquired and the actual device configuration information D2 stored in the device configuration information database DB2. And it is arranged for the setting data downloading unit 33 of the I/O device 12a to download this setting data for download D3 that has thus been generated to the new field device 11 that has newly been connected to the plant control system P1.

According to this, it is possible to perform exchange of the field device 11 without any requirement for engineering by a system engineer. As a result, it is possible to a avoid decrease in the production efficiency of the plant. Moreover, since off-line engineering can also be performed with the setting system 2 of this embodiment, accordingly there is the advantageous aspect that it is possible to shorten the working time in the field, in a similar manner to the case with prior art off-line engineering. It should be understood that, with the setting system 2 of the present embodiment, it would also be possible to omit the device configuration information database DB2, since, when the field device 11 is present, it is possible to create the setting data for download D3 by using the device configuration information D2 acquired from the field device 11.

Variant Embodiments

Figure 9:
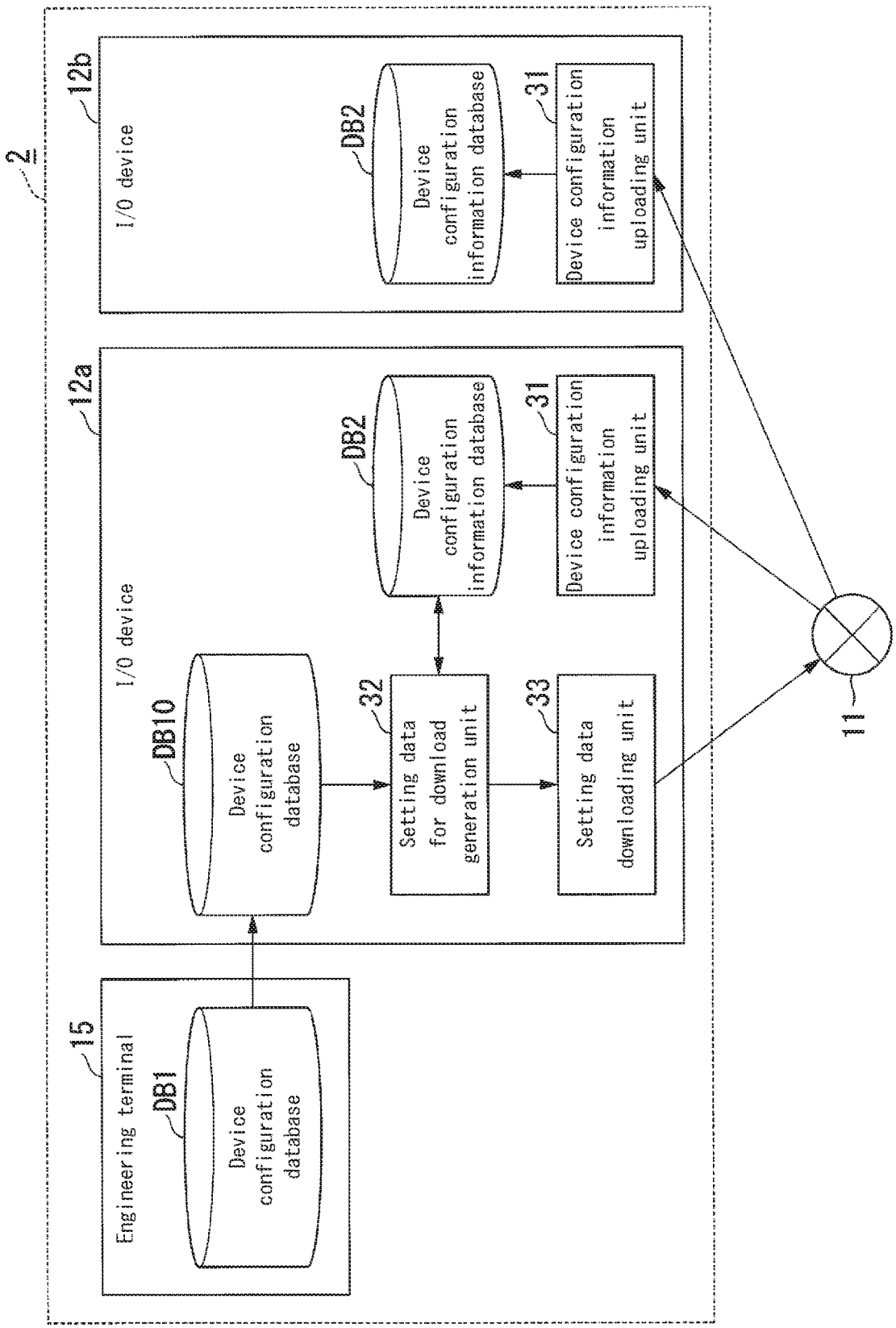
FIG. 9 is a block diagram illustrating a variant embodiment of the setting system according to the second embodiment.

FIG. 9 is a block diagram illustrating a variant embodiment of the setting system according to the second embodiment. As illustrated in FIG. 9, the setting system 2 according to this variant embodiment is implemented with an engineering terminal 15 (i.e. an engineering device) and two I/O devices 12a and 12b. The setting system 2 according to this variant embodiment illustrates a case in which two I/O devices are connected to a single field device 11 (in other words, when the I/O devices are duplexed).

The I/O devices 12a and 12b have structures similar to that of the I/O device 12 illustrated in FIG. 8, and each of them comprises a device configuration information uploading unit 31, a setting data for download generation unit 32, a setting data downloading unit 33, a device configuration information database DB2, and a device configuration database DB10. In FIG. 9, for the convenience of illustration, the setting data for download generation unit 32, the setting data downloading unit 33, and the device configuration database DB10 of the I/O device 12b are omitted, and only the device configuration information uploading unit 31 and the device configuration information database DB2 are illustrated.

In these duplexed I/O devices 12a and 12b, it is necessary to ensure that the device configuration information database DB2 is the same in both the I/O device 12a and the I/O device 12b. Accordingly, at the timing that the new field device 11 is connected to the process control system PS, each of the device configuration information uploading units 31 provided to the I/O devices 12a and 12b that are connected to the field device 11 acquires the actual device configuration information from the field device 11 and stores it in the device configuration information database DB2.

However it will be sufficient for the generation of the setting data for download D3 and its downloading to the new field device 11 that is connected to the process control system PS to be performed by only one of the I/O devices (in the example illustrated in FIG. 9, by the I/O device 12a). However, supposing that the I/O device 12a malfunctions or the like, then, instead of the I/O device 12a, the I/O device 12b performs generation of the setting data for download D3 and downloading thereof to the new field device 11 that is connected to the process control system PS.

Embodiment 3

Figure 10:
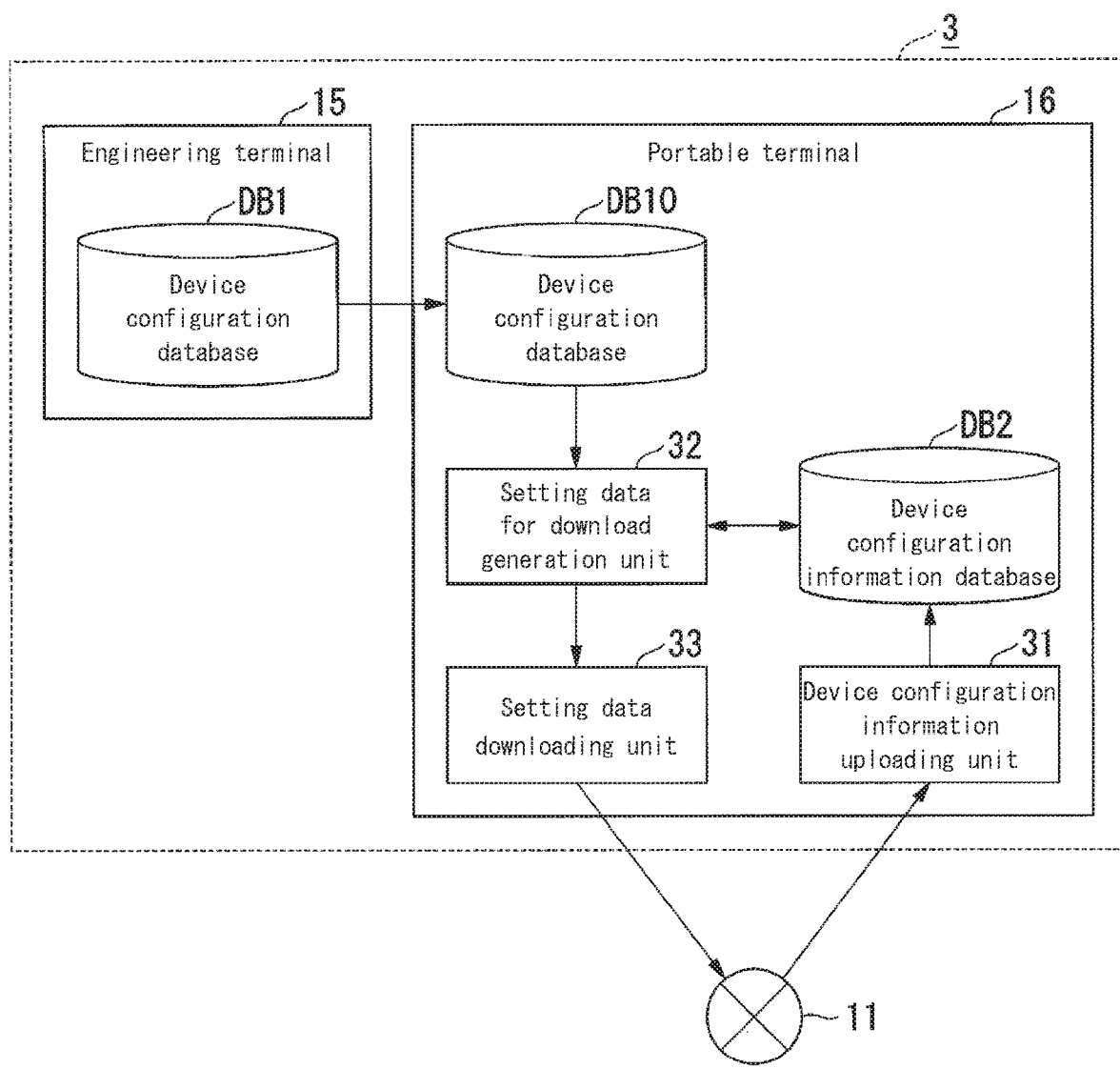
FIG. 10 is a block diagram illustrating the structure of principal portions of a setting system according to a third embodiment.

FIG. 10 is a block diagram illustrating the structure of principal portions of a setting system according to a third embodiment. As illustrated in FIG. 10, the setting system 3 of this embodiment is implemented with an engineering terminal 15 (i.e. an engineering device) and a portable terminal 16 (i.e. a setting device); this is a system that, for example, when a field device 11 is to be exchanged, establishes upon the new field device 11 the settings that are necessary in order to enable the new field device 11 to perform predetermined operation.

The engineering terminal 15 has a structure similar to that of the engineering terminal 15 of the first embodiment. In FIG. 10, just as in FIG. 8, the user setting unit and the logical device setting data generation unit 22 are omitted, and only the device configuration database DB1 is illustrated.

Just as in the case of the I/O device 12 of the second embodiment, the portable terminal 16 comprises a device configuration information uploading unit 31, a setting data for download generation unit 32, a setting data downloading unit 33, a device configuration information database DB2, and a device configuration database DB10. This portable terminal 16 can be transported by, for example, the maintenance staff who are working at the plant site, and is used for connecting to the field device 11 in order to make settings upon the field device 11. The portable terminal 16 may, for example, be realized by a portable personal computer, such as a notebook type personal computer or a tablet or the like.

The portable terminal 16 may be connected to the engineering terminal 15 in any manner that is appropriate. For example, the manner in which the portable terminal 16 is connected to the engineering terminal 15 may be a method of connection to the engineering terminal 15 via the control network N by the portable terminal 16 being directly connected to the network N, or may be a method of connection to the engineering terminal 15 by the portable terminal 16 establishing wireless communications with an access point that is connected to the control network N. Alternatively, the portable terminal may be connected directly to the engineering terminal 15 by a connection cable, i.e. not via the control network N.

Provided that the portable terminal 16 can obtain a copy of the logical device setting data D1 (refer to FIG. 3) stored in the device configuration database DB1 provided in the engineering terminal 15, there is no need for the portable terminal to be communicably connected to the engineering terminal 15. For example, if it is possible for a copy of the logical device setting data D1 stored in the device configuration database DB1 to be stored upon a non volatile storage medium such as a USB memory stick or the like so that it can be loaded into the portable terminal 16, then there is no need for the portable terminal 16 to be communicably connected to the engineering terminal 15.

With the setting system 3 of this embodiment, all of the components required for performing setting processing for the field device 11 (i.e. the device configuration information uploading unit 31, the setting data for download generation unit 32, the setting data downloading unit 33, the device configuration information database DB2, and the device configuration database DB10) are provided in the portable terminal 16. Accordingly, with the setting system 3 of this embodiment, it is possible for the member of the maintenance staff who is carrying the portable terminal 16 to proceed to the position in the plant site where the field device 11 is installed, and, if he connects the portable terminal 16 to the new field device 11 that is connected to the process control system PS, then he is able to perform downloading of the setting data for download D3 to the field device 11.

Accordingly, it is possible to perform exchange of the field device 11 without any requirement for engineering by a system engineer. As a result, it is possible to avoid a decrease in the production efficiency of the plant. Moreover, since off-line engineering can also be performed with the setting system 3 of this embodiment, accordingly there is an advantageous aspect that that it is possible to shorten the working time in the field, in a similar manner to the case with prior art off-line engineering. It should be understood that, with the setting system 3 of the present embodiment, it would also be possible to omit the device configuration information database DB2 when the field device 11 is present, in a similar manner to the case with the setting system 2 of the second embodiment.

Embodiment 4

Figures 11, 12:
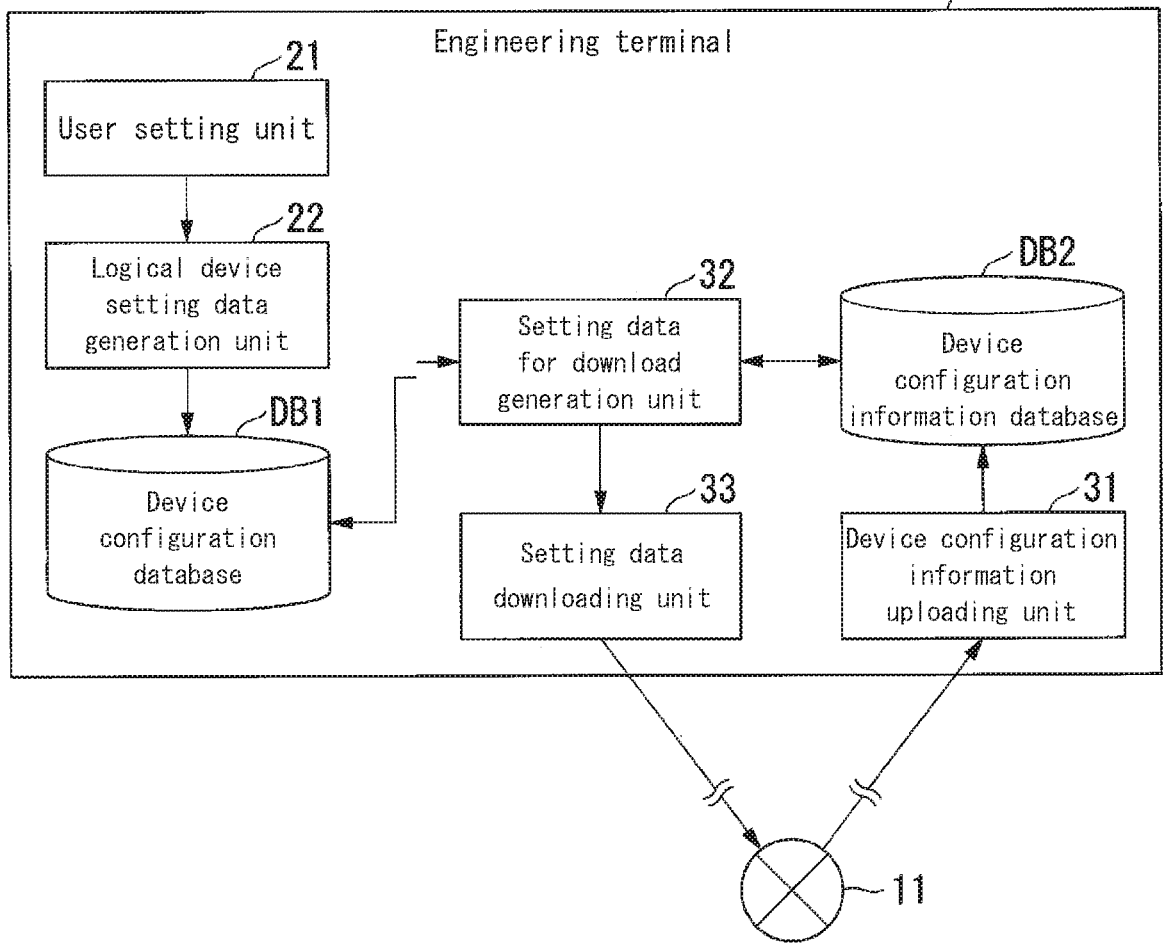
FIG. 11 is a block diagram illustrating the structure of principal portions of a setting device according to a fourth embodiment.
FIG. 12 is a diagram illustrating an example, in a fifth embodiment, of a device specific setting data portion included in setting data for a logical device.

FIG. 11 is a block diagram illustrating the structure of principal portions of a setting device according to a fourth embodiment. As illustrated in FIG. 11, in addition to the user setting unit 21, the logical device setting data generation unit 22, and the device configuration database DB1 illustrated in FIG. 2, the engineering terminal 15*a* that serves as the setting device of this embodiment also includes the device configuration information uploading unit 31, the setting data for download generation unit 32, the setting data downloading unit 33, and the device configuration information database DB2 illustrated in FIG. 2. In other words, the engineering terminal 15*a* that serves as the setting device of this embodiment is a device in which the function of the engineering terminal 15 and the function of the operation monitoring terminal 14 illustrated in FIG. 2 are combined.

With the engineering terminal 15*a* that serves as the setting device of this embodiment, all of the components required for performing setting processing for the field device 11 (i.e. the device configuration information uploading unit 31, the setting data for download generation unit 32, the setting data downloading unit 33, the device configuration database DB1, and the device configuration information database DB2) are provided in the engineering terminal 15*a*. Accordingly, in this embodiment, it is possible to perform downloading of the setting data for download D3 to a new field device 11 that is newly connected to the process control system by employing only the engineering terminal 15*a*. Moreover, since in this embodiment it is possible to perform off-line engineering, accordingly there is the beneficial aspect that it is possible to shorten the working time in the field, in a similar manner to the case with off-line engineering in the prior art.

Embodiment 5

Next, a setting system according to a fifth embodiment will be explained. In the first through the fourth embodiments described above, the device specific setting data portion D11 included in the logical device setting data D1 stored in the device configuration database DB1 (or in the device configuration database DB10) was only described in the logical identification format. By contrast, in this embodiment, in the device specific setting data portion D11 included in the logical device setting data D1, both items described in the logical identification format and items described in the device dependent format may be mixed together.

FIG. 12 is a figure illustrating an example, in a fifth embodiment, of a device specific setting data portion that is included in the logical device setting data. As illustrated in FIG. 12, the device specific setting data portion D11 is data in which either "identification information" or "physical information" is associated with "device parameter". Here, "device parameter" consists of "device parameter name" and "set value", "identification information consists of "object name" and "relative address", and "physical information" consists of "physical address".

In the example illustrated in FIG. 12, the first and second lines of the setting data D11 are data in which "identification information" is associated with "device parameter". In concrete terms, in the first line of the setting data D11, the "identification information" whose "object name" and "relative address" are respectively "Obj001" and "address+10" is associated with the "device parameter" whose "device parameter name" and "set value" are respectively "P101" and "15". Furthermore, in the second line of the setting data D11, the "identification information" whose "object name" and "relative address" are respectively "Obj001" and "address+35" is associated with the "device parameter" whose "device parameter name" and "set value" are respectively "P102" and "10".

On the other hand, in the example illustrated in FIG. 12, the third line of the setting data D11 is data in which "physical information" is associated with "device parameter". In concrete terms, in the third line of the setting data D11, the "physical information" whose "physical address" is "address 2015" is associated with the "device parameter" whose "device parameter name" and "set value" are respectively "P103" and "25".

This type of setting data D11 (i.e. setting data in which items described in logical information format and items described in device dependent format are mixed together) may be created by a system engineer specifying the format for the setting data D11 via an input screen that is displayed, for example, upon the user setting unit 21 of the engineering terminal 15 or 15*a*. Here, it is desirable to set a flag in the setting data D11 for distinguishing between an item that is described in logical information format and an item that is described in device dependent format.

When generating the setting data for download D3, the setting data for download generation unit 32 may, for example, determine the format of each item of setting data D11 on the basis of the flag described above, and may generate the setting data for download D3 on the basis of the result of that determination. In concrete terms, in the case of setting data that has been determined to be described in the logical identification format, the setting data for download generation unit 32 generates the setting data for download by employing this setting data and the actual device configuration information D2 that is stored in the device configuration information database DB2; while, in the case of setting data that has been determined to be described in the device dependent format, it is used as the setting data for download just as it is. The setting data for download D3 is generated in this manner.

In this manner, in this embodiment, it is possible for items that are described in the logical identification format and items that are described in the device dependent format to be mixed together in the device specific setting data portion D11. Accordingly, for example, operation is possible with setting data for a field device 11 that is already in existence that is described in the device dependent format being stored in the device configuration database DB1, and with setting data for a new field device 11 (including a replacement field device) that is described in the logical identification format also being stored in the device configuration database DB1. In this way, with the setting system according to the present embodiment, for example, in implementing extension or alteration while operating a portion of an already existing plant (i.e. when adding or exchanging one or more field devices), it becomes possible to employ the logical identification format for the field device or devices that are to be the subject of extension or alteration, while not changing over to a new logical identification format for the field devices that already exist and are in operation (in other words, without any necessity for again performing downloading of setting data for download D3 to those field devices), so that it is possible to perform extension or alteration of the plant without causing a stoppage to its working sections.

Embodiment 6

Next, a setting system according to a sixth embodiment will be explained. The first through the fifth embodiments described above were based upon the assumption of a process control system PS that performed communication via an I/O device 12. However, in some process control systems PS, communication may be performed, not via an I/O device 12, but rather between the field devices 11 themselves. The setting system 4 of this embodiment is a system that, in such a case, performs the necessary settings for enabling a new field device to perform predetermined operation upon the field device 11 itself.

Figure 13:
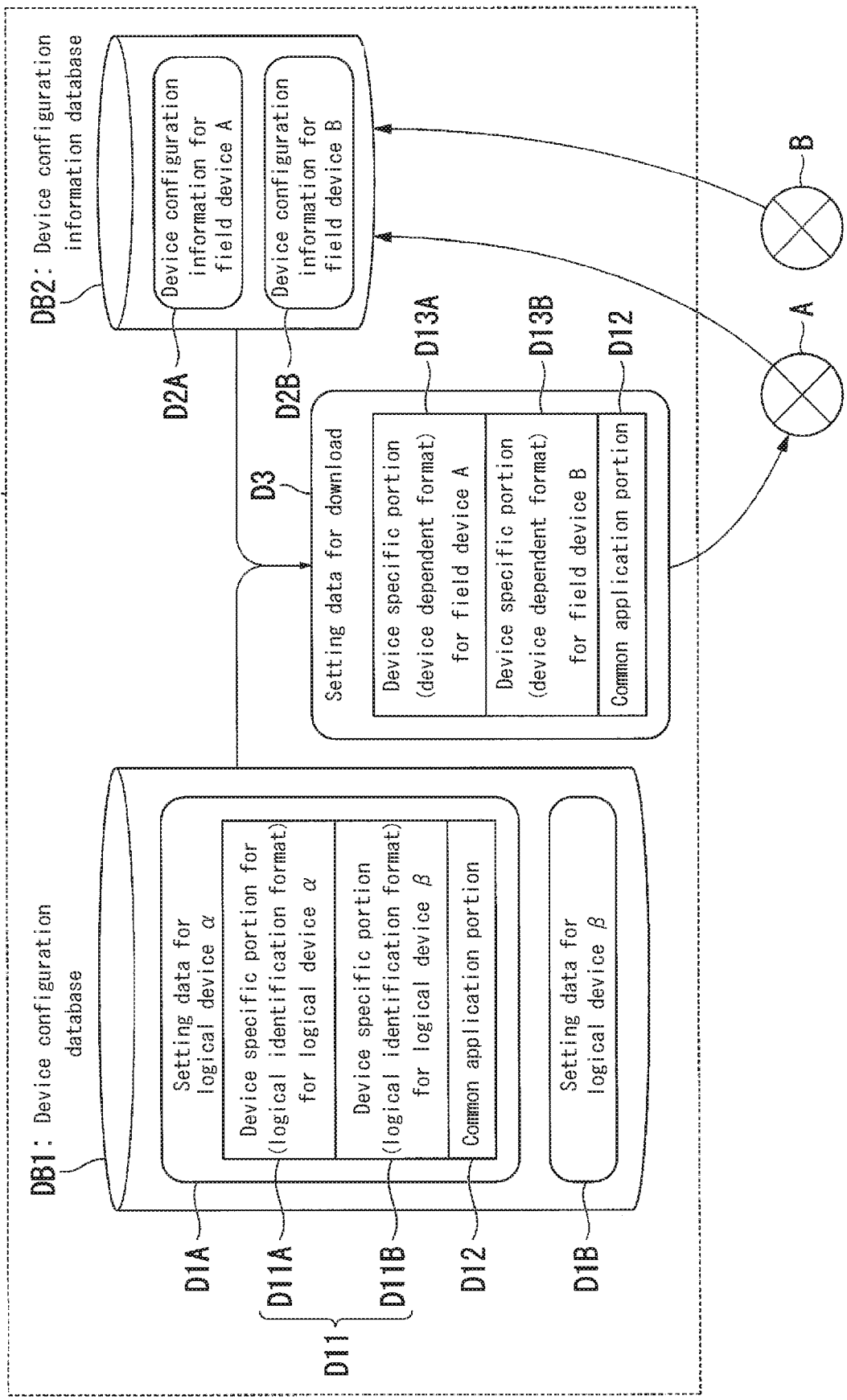
FIG. 13 is a block diagram illustrating an overview of a setting system and a setting method according to a sixth embodiment.

FIG. 13 is a block diagram illustrating an overview of the setting system and the setting method according to the sixth embodiment. In the following description, two field devices that perform communication without going via any I/O device 12 will be referred to as "field device A" and "field device B". As illustrated in FIG. 13, setting data D1A for a logical device α that corresponds to the field device A and setting data D1B for a logical device β that corresponds to the field device B are stored in the device configuration database DB1 provided to the setting system 4 of this embodiment.

A device specific setting data portion D11A for the logical device α that is described in the logical identification format and a device specific setting data portion D11B for the logical device β that is described in the logical identification format are respectively included in the setting data D1A for the logical device α and in the setting data D1B for the logical device β. In other words, for example, the device specific setting data portion D11A of the setting data D1A for the logical device α includes the setting data D11A for itself (i.e. for the logical device α) and the setting data D11D for its communication partner (i.e. for the logical device β). It should be understood that the same holds for the device specific setting data portion of the setting data D1B for the logical device β; but, in FIG. 13, the details of the setting data D1B for the logical device β are omitted.

In, for example, the case of downloading the setting data for download D3 to the field device A, the setting system 4 of this embodiment acquires, not only the configuration information D2A for the field device A which is to be the subject of downloading, but also the device configuration information D2B for the field device B which is the communication partner, and stores both of these in the device configuration information database DB2. And then the setting system 4 generates setting data for download on the basis of the setting data D1A for the logical device α, and the device configuration information D2A and D2B for the field device A and the field device B respectively.

The setting data D3 for download is obtained by converting the setting data D11A and D11B included in the setting data D1A for the logical device α stored in the device configuration database DB1 into setting data D13A and D13B respectively. In other words, the device specific setting data portion D11A for the logical device α that is described in the logical identification format is converted into data D13A for the field device A in the device dependent format, and the device specific setting data portion D11B for the logical device β that is described in the logical identification format is converted into data D13B for the field device B in the device dependent format.

Even if the already present field device A is replaced with a new field device A, it is still possible to perform non-stop continuous communication between the new field device A and the field device B by downloading the setting data for download D3 that has been generated in this manner into the new field device A.

Although several embodiments have been explained in the above description, the present disclosure is not to be considered as being limited to the embodiments described above; modifications can be freely made within the scope of the present disclosure. For example, it would be acceptable to arrange to implement a part or all of the setting system and a part or all the setting device of any of the embodiments described above with a computer. Moreover, it would also be acceptable to arrange to implement the functions of the setting system and the setting device by recording part or all of a program for implementing them upon a computer readable recording medium, and by reading this program recorded upon the recording medium into a computer system and executing it.

It should be understood that, in this specification, "computer system" means a computer system that is housed internally to the setting system and the setting device and includes the OS and hardware such as peripheral devices and so on. Furthermore, "computer readable storage medium" means a transportable medium such as a floppy disk, an opto magnetic disk, a ROM, a CD ROM or the like, or a storage device housed internally to the computer system, such as a hard disk or the like.

The invention claimed is:

1. A setting system that sets settings to a field device required for predetermined operation to be performed by the field device, comprising:
   an engineering terminal having a database that stores setting data in a first format in which a device parameter to be set to the field device and identification information that logically identifies the device parameter are associated, and for which authority prescribed in advance is required in order to change the stored data; and a setting device that, using device configuration information specifying a physical structure of the field device and the setting data in the first format obtained by reference to the database of the engineering terminal, generates setting data in a second format in which physical information specifying a physical address at which the device parameter is to be set is associated with the device parameter, and sets the setting data to the field device, wherein the identification information includes object identification information in which information that identifies an object to which the device parameter belongs and relative address information that specifies the relative address by a value at which the device parameter is to be set are associated;

the device configuration information includes information in which the object identification information that identifies the object and starting address information that specifies the starting address by a value of the object are associated; and the setting device generates the setting data in the second format by adding the value of the relative address information and the value of the starting address information with which the same object identification information is associated.

2. A setting system according to claim 1, wherein:

in addition to the setting data in the first format, the database stores setting data in the second format; and the setting device sets to the field device the setting data in the second format generated by using the device configuration information and the setting data in the first format obtained by reference to the database, or the setting data in the second format obtained by reference to the database.

3. A setting system according to claim 1, wherein:

the database stores, in association, setting data in the first format for a target field device that is one among several field devices, and setting data in the first format for another field device that performs communication with the target field device; and the setting device sets the setting data in the first format for the target field device to the first field device, and sets the setting data in the first format for the target field device to the another field device, respectively.

4. A setting system according to claim 1, wherein:

in addition to the setting data in the first format, the database stores common data, employed by a control application of the process control system, that does not depend upon the field device; and the setting device sets the common data to the field device, along with the setting data in the first format.

5. A setting system according to claim 1, wherein the setting device comprises a storage unit that stores the setting data in the second format that has been generated.

6. A setting system according to claim 1, wherein the setting device comprises:

a device configuration information acquisition unit that acquires the device configuration information from the field device; and a device configuration information database that stores the device configuration information acquired by the device configuration information acquisition unit.

7. A setting device that sets settings to a field device required for predetermined operation to be performed by the field device, comprising:

a database that stores setting data in a first format in which a device parameter to be set to the field device and identification information that logically identifies the device parameter are associated, and for which authority prescribed in advance is required in order to change the stored data;

a generation unit that, using device configuration information specifying a physical structure of the field device and the setting data in the first format obtained by reference to the database, generates setting data in a second format in which physical information specifying a physical address at which the device parameter is to be set is associated with the device parameter; and a downloading unit that sets to the field device the setting data in the second format, wherein the identification information includes object identification information in which information that identifies an object to which the device parameter belongs and relative address information that specifies the relative address by a value at which the device parameter is to be set are associated;

the device configuration information includes information in which the object identification information that identifies the object and starting address information that specifies the starting address by a value of the object are associated; and the setting device generates the setting data in the second format by adding the value of the relative address information and the value of the starting address information with which the same object identification information is associated.

8. A setting method that sets settings upon a field device required for predetermined operation to be performed by the field device, comprising:

a first step of obtaining setting data in a first format by referring to a database that stores setting data in the first format in which a device parameter to be set to the field device and identification information that logically identifies the device parameter are associated, and for which authority prescribed in advance is required in order to change the stored data, wherein the identification information includes object identification information in which information that identifies an object to which the device parameter belongs and relative address information that specifies the relative address by a value at which the device parameter is to be set are associated;

a second step of, using device configuration information specifying a physical structure of the field device and the setting data in the first format obtained in the first step, generating setting data in a second format in which physical information specifying a physical address at which the device parameter is to be set is associated with the device parameter, wherein the device configuration information includes information in which the object identification information that identifies the object and starting address information that specifies the starting address by a value of the object are associated;

a third step of setting to the field device the setting data in the second format that was generated in the second step; and a fourth step of generating the setting data in the second format by adding the value of the relative address information and the value of the starting address information with which the same object identification information is associated.

9. A non-transitory computer readable storage medium which stores a setting program that, when executed by a computer that sets settings to a field device required for predetermined operation to be performed by the field device, causes the computer to function as:

a database that stores setting data in a first format in which a device parameter to be set to the field device and identification information that logically identifies the device parameter are associated, and for which authority prescribed in advance is required in order to change the stored data, wherein the identification information includes object identification information in which information that identifies an object to which the device parameter belongs and relative address information that specifies the relative address by a value at which the device parameter is to be set are associated;

a generation unit that, using device configuration information specifying a physical structure of the field device and the setting data obtained by reference to the database, generates setting data in a second format in which physical information specifying a physical address at which the device parameter is to be set is associated with the device parameter, wherein the device configuration information includes information in which the object identification information that identifies the object and starting address information that specifies the starting address by a value of the object are associated, and wherein the generation unit generating the setting data in the second format by adding the value of the relative address information and the value of the starting address information with which the same object identification information is associated; and a downloading unit that sets to the field device the setting data in the second format.

* * * * *